United States Patent [19]
Hansler

[11] 3,804,529
[45] Apr. 16, 1974

[54] DETECTION BY LASER DIFFRACTION OF FILAMENT COILS WOUND ON A MANDREL

[75] Inventor: Richard L. Hansler, Cleveland, Ohio

[73] Assignee: General Electric Company, Schenectady, N.Y.

[22] Filed: Jan. 24, 1973

[21] Appl. No.: 326,293

[52] U.S. Cl............. 356/167, 356/199, 250/219 R, 250/219 S
[51] Int. Cl. .......................................... G01b 11/14
[58] Field of Search .......... 356/160, 159, 167, 199; 250/219 S, 219 R

[56] References Cited
UNITED STATES PATENTS
3,709,610  1/1973  Kruegle............................ 356/160
3,659,950  5/1972  Troll et al...................... 250/219 S OTHER PUBLICATIONS
"Determination of Small Dimensions by Diffraction of a Laser Beam," M. Koedam, Philips Tech. Rev., Vol. 27, No. 7, 7/66, pg. 208–210.

Primary Examiner—Ronald L. Wibert
Assistant Examiner—P. K. Godwin
Attorney, Agent, or Firm—Norman C. Fulmer

[57] ABSTRACT

A mandrel wire having spaced-apart coils (such as lamp filament coils) wound thereon is moved, along the mandrel axis, transversely through a laser beam which is directed toward a laser detector. The mandrel causes laterally diffracted laser components to be produced, and when a coil on the moving mandrel is in the laser beam, its turns cause diffracted laser components to be produced in planes parallel to the mandrel. A mask is positioned to shield the detector from the laser beam and from its components diffracted by the mandrel, whereby the detector receives laser energy only from the components diffracted by the coils, thus producing an output signal that is useful for purposes such as counting coils, measuring coil length, and actuating a coil cutter.

8 Claims, 3 Drawing Figures

PATENTED APR 16 1974 3,804,529

DETECTION BY LASER DIFFRACTION OF FILAMENT COILS WOUND ON A MANDREL

BACKGROUND OF THE INVENTION

The invention is in the field of detecting spaced-apart filament coils on a moving mandrel, such as is useful in manufacturing filaments for electric lamps.

A widely used method of manufacturing filament coils for electric lamps is to wind a plurality of spaced-apart helical filament coils on a wire mandrel. The wound filaments may consist of a single wire, or braided wires, or a "coiled-coil," usually of tungsten. The mandrel wire may be molybdenum or other material which is feasible to dissolve in acid. The mandrel wire, and filament wire linking two adjacent coils, is then cut approximately halfway between each adjacent pair of coils, and the cut mandrel sections are dissolved in an acid which does not attack the tungsten coils, thereby resulting in a plurality of helical filament coils each having a pair of connector legs extending respectively from the ends of the helix.

The step of cutting the mandrel (and coils) usually is performed at high speed, by moving a long length of coil-containing mandrel (as it is unwound from a reel) in a direction axially of the mandrel and through the path of a light beam which is aimed or focused at a photodetector. Whenever a coil is in the light beam, its shadow effect causes a change in the output of the detector, which change is utilized to actuate a cutter blade for cutting the mandrel (and the interconnecting coil wire) at the desired places. The optical shadow detector arrangement also is useful for counting the coils, and for measuring their lengths. The accuracy, reliability and maximum speed of operation of the optical shadow detection method are all reduced when detecting very small coils of small wire size.

SUMMARY OF THE INVENTION

Objects of the invention are to provide an improved arrangement for detecting spaced wound coils on a moving mandrel, and to provide such an arrangement that effectively detects small coils of fine wire on a fast-moving mandrel.

The invention comprises, briefly and in a preferred embodiment, a laser detector, means directing a laser beam toward the detector, an elongated mandrel having a plurality of spaced-apart coils wound thereon, means for moving the coil-containing mandrel along its axis in a path crosswise through the laser beam, and a mask positioned between the mandrel and the detector for shielding the detector from the laser beam and also from components thereof diffracted laterally by the mandrel. When a coil on the mandrel is in the laser beam, it causes diffraction of laser beam components in planes parallel to the mandrel and which pass around the mask and reach the detector thereby producing a signal indicating the presence of a coil in the laser beam. Preferably a lens is positioned between the mandrel and the detector, for focusing the diffracted laser components onto the detector. The mask may be positioned on the lens. Also, preferably the laser beam shape is made wide enough laterally of the mandrel so that lateral moving or whipping of the moving mandrel will not move it out of the beam. A cylindrical type of lens preferably is positioned between the laser beam source and the mandrel to focus the beam to a narrow dimension at the mandrel in an orientation to improve the accuracy of detecting the coils on the mandrel.

DESCRIPTION OF THE PREFERRED EMBODIMENTS

Figure 1:
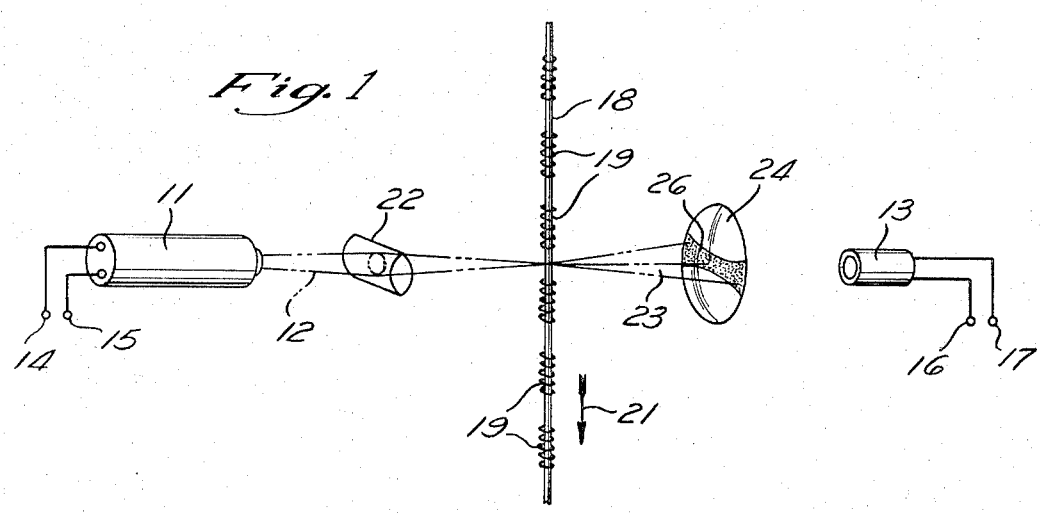
FIG. 1 is a perspective view of a preferred embodiment of the invention, shown at a time when no coil on the moving mandrel is in the laser beam.

A laser device 11 produces a laser beam 12 that is directed toward a laser detector 13. The laser beam device 11 is provided with a pair of electrical connection terminals 14, 15 for connection thereto of suitable power to operate the device 11. The laser detector 13 is provided with a pair of electrical output terminals 16 and 17. A mandrel wire 18 is provided with a plurality of coils 19 wound helically on the mandrel and spaced apart from one another, as shown. The coils 19 are wound from a continuous long wire, of tungsten, for example, if the coils 19 are intended for use as filaments in electric lamps. The coil wire between the individual coils 19, not shown on the drawing, can lie against the mandrel 18 in a straight line between the coils, or may be in the form of a few turns around the mandrel between the individual coils 19. Means (such as powered rollers, not shown) are provided to move the coil-carrying mandrel 18 from a supply reel and in a direction along its own axis and in a path crosswise to the laser beam 12, as indicated by numeral 21.

The laser beam 12 emerging from the device 11 is of circular cross-sectional shape, and has a diameter considerably greater than that of the mandrel 18, so that lateral moving or whipping of the mandrel will not move it out of the beam, as the mandrel is moved at high speed through the beam. A cylindrical type of lens 22 is interposed in the path of the laser beam 12 between the laser device 11 and the coil-carrying mandrel 18 and is oriented to focus the laser beam 12 vertically so that it converges and focuses at the mandrel 18 into a horizontal line perpendicular to the axis of the mandrel 18, so that the laser beam 12 is very narrow at this point, thereby providing a high degree of accuracy of detecting the coils 19, in a manner to be described. The mandrel 18, vertically oriented in the laser beam, causes diffraction of laser beam components in a horizontal direction. These diffracted laser beam components cause the laser beam to spread out horizontally as it leaves the position of the mandrel 18 and moves toward the detector 13, as indicated by numeral 23. The cross-sectional shape of the laser beam in this region 23 is generally rectangular, and is wider horizontally than is its vertical height. A convex lens 24 is interposed in the path of the laser beam 23, between the mandrel 18 and the detector 13, and is of such a diameter as to intercept the diffracted components in the laser beam 23. A mask 26, opaque to the laser beam 23, is provided on the lens 24 and is of such a shape and size to intercept all of the laser beam 23, including its diffraction components, so as to prevent any laser energy from reaching the detector 13, at times when the mandrel 18, but not a coil 19, is in the path of the laser beam. The mask 26, being on a convex surface of the lens 24, is shaped to be relatively narrower at its center and relatively wider toward its ends, to properly intercept the expanding laser beam 23. Also, the mask is shaped in this manner to intercept vertical laser diffraction components produced when the mandrel whips or twists slightly sideways as it moves.

Figure 2:
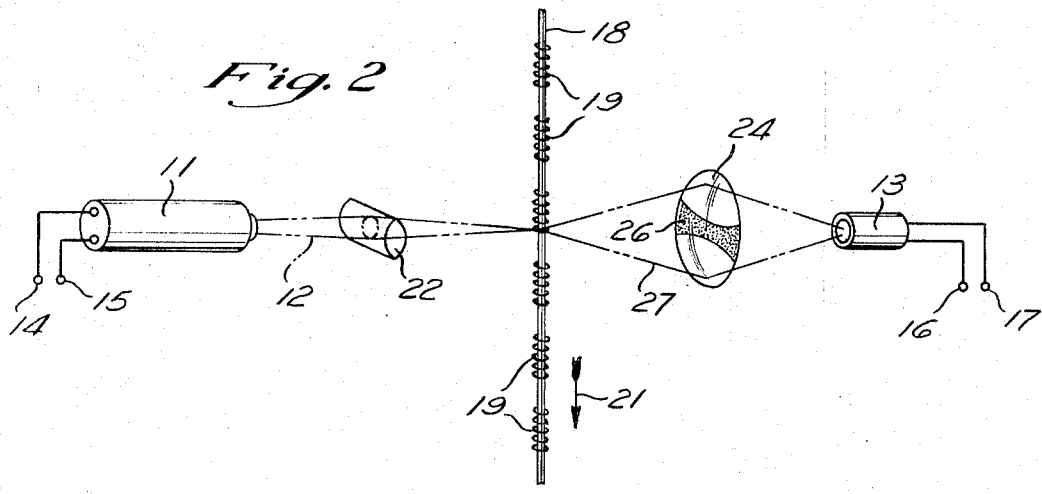
FIG. 2 is a view similar to FIG. 1, but at a time when a coil on the moving mandrel is in the path of the laser beam.

When the moving mandrel is in a position so that a coil 19 is in the laser beam, as shown in FIG. 2, the turns of the coil cause laser beam components to diffract and spread out in directions parallel to the mandrel 18, i.e., in vertical directions if the mandrel 18 is vertical as in FIG. 2. These vertically diffracted laser beam components are contained within an envelope designated by the dashed line 27 in FIG. 2, and pass through the lens 24 above and below the mask 26, and converge upon the detector 13 thereby causing an output signal to be produced at its output terminals 16 and 17 which is indicative of a coil being present in the laser beam, and which signal can be used for counting coils, or measuring the length of the coils, or for actuating a cutter means for cutting the mandrel (and interconnecting coil wire) at points approximately midway between the individual coils 19.

Figure 3:
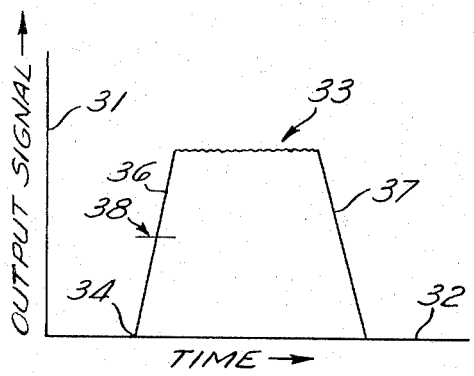
FIG. 3 is a plot of laser detector output with respect to time, showing the output signal that is produced when a coil moves into and out of the path of the laser beam.

In FIG. 3, the vertical axis 31 represents output signal strength at the detector output terminals 16 and 17, and the horizontal axis 32 represents time as the coil-carrying mandrel 18 moves through the laser beam. The curve 33 represents a typical signal output of the detector 13, as a coil 19 moves through the laser beam. The output signal 33 begins to rise at a time point 34, when the leading edge of the first turn of a coil 19 begins to enter the laser beam. The signal 33 reaches about one-third of its peak value when the first turn of a coil has completely entered the laser beam, in a typical arrangement of the apparatus. The curve 33 reaches its peak value when the coil 19 has completely entered the vertical height dimension of the laser beam, and thus the curve 33 has a sloped rise front 36. Similarly, the output signal curve 33 has a sloped trailing edge 37 that is produced as the trailing end of a coil 19 leaves the laser beam. When the output terminals 16 and 17 of the detector 13 are connected to an actuating means, such as a coil counter, coil length measurer or mandrel cutter, such an actuated device preferably is designed to have an actuating threshold value at a point 38 approximately midway of the height of the leading edge 36 of the detector output signal 33.

The invention has been found to achieve the objectives of accurately and effectively detecting small coils of fine wire on a fast-moving mandrel. For example, lamp filament coils consisting of tungsten wire one mil in diameter wound on a mandrel of 5-mil diameter wire, and moving through a laser beam having a thickness of about 5 mils at its crossover focus point, causes the detector output signal 33 to reach its halfway value 38 when only one or two of the first turns of the coil have entered the laser beam, thus insuring a high degree of accuracy in a high speed operation. The same accuracy is achieved when a coil leaves the laser beam.

The mask 26 may comprise metal foil cemented to the surface of the lens 24, or may be a separate piece of metal or other suitable material suitably positioned in the path of the laser beam.

While preferred embodiments of the invention have been shown and described, various other embodiments and modifications thereof will become apparent to persons skilled in the art, and will fall within the scope of the invention as defined in the following claims.

What I claim as new and desire to secure by Letters Patent of the United States is:

1. Apparatus for detecting coils spaced apart on a mandrel, comprising a laser detector, a laser device positioned to direct a laser beam toward said detector, means for moving said mandrel along its axis in a path substantially crosswise through said laser beam, whereby said mandrel causes laterally diffracted laser components to be produced, and when a coil is in the laser beam, its turns cause diffracted laser components to be produced in planes parallel to the mandrel, and a mask positioned to shield said detector from said laser beam and its components diffracted by the mandrel, said mask being shaped to permit said detector to receive said laser components diffracted by a coil.

2. Apparatus as claimed in claim 1, in which said laser beam is wider than the diameter of said mandrel, so that the moving mandrel will remain in the beam despite lateral whipping motion thereof.

3. Apparatus as claimed in claim 2, including a cylindrical type of lens positioned between said laser device and said mandrel to focus said beam to a narrow thickness at said mandrel in the form of a line perpendicular to the mandrel axis.

4. Apparatus as claimed in claim 1, including a convex lens positioned between said mandrel and said detector and arranged to focus said laser components diffracted by a coil onto said detector.

5. Apparatus as claimed in claim 4, in which said mask is positioned on said lens.

6. Apparatus as claimed in claim 5, in which said lens has a convexly shaped surface facing toward said mandrel, and in which said mask is elongated and extends substantially across the diameter of the lens, said mask being relatively narrower at the center thereof and relatively wider toward both ends thereof.

7. Apparatus as claimed in claim 6, in which said laser beam is wider than the diameter of said mandrel, and including a cylindrical type of lens positioned between said laser device and said mandrel to focus said beam to a narrow thickness at said mandrel in the form of a line perpendicular to the mandrel axis.

8. A method of detecting coils spaced apart on a mandrel, comprising the steps of providing a laser detector and a laser device for directing a laser beam toward said detector, moving said mandrel along its axis in a path substantially crosswise through said laser beam, whereby said mandrel causes laterally diffracted laser components to be produced, and when a coil is in the laser beam, its turns cause diffracted laser components to be produced in planes parallel to the mandrel, and partly masking said laser beam and its diffraction components so that only said diffraction components caused by a coil can reach said detector.

* * * * *